(12) United States Patent
Kurzka et al.

(10) Patent No.: US 8,025,306 B2
(45) Date of Patent: Sep. 27, 2011

(54) TOW TRUCK WHEEL RESTRAINT AND METHODS OF USING SAME

(76) Inventors: Robert S. Kurzka, Itasca, IL (US); John Pemberton, Westmont, IL (US)

( * ) Notice: Subject to any disclaimer, the term of this patent is extended or adjusted under 35 U.S.C. 154(b) by 0 days.

(21) Appl. No.: 12/555,160

(22) Filed: Sep. 8, 2009

(65) Prior Publication Data
US 2011/0057415 A1 Mar. 10, 2011

(51) Int. Cl.
*B62D 53/04* (2006.01)
(52) U.S. Cl. .......................... 280/402; 414/426
(58) Field of Classification Search .................. 280/400, 280/402; 180/490.1; 414/426, 429, 563
See application file for complete search history.

(56) References Cited

U.S. PATENT DOCUMENTS

| | | | | |
|---|---|---|---|---|
| 2,411,803 A * | 11/1946 | Parrott | ............................. | 254/94 |
| 3,182,829 A | 5/1965 | Wagner | | |
| 3,434,608 A * | 3/1969 | Nelson | ........................... | 414/563 |
| 3,924,763 A | 12/1975 | Pigeon | | |
| 4,473,334 A * | 9/1984 | Brown | ........................... | 414/563 |
| 4,573,857 A | 3/1986 | Porter, Sr. et al. | | |
| 4,637,623 A | 1/1987 | Bubik | | |
| 4,793,763 A | 12/1988 | Bubik | | |
| 4,836,737 A * | 6/1989 | Holmes et al. | ................. | 414/563 |
| 4,968,052 A | 11/1990 | Alm et al. | | |
| 5,123,802 A * | 6/1992 | Bell | ............................... | 414/563 |
| 5,575,606 A * | 11/1996 | Kiefer et al. | .................. | 414/563 |
| 5,716,188 A * | 2/1998 | Pigeon | ........................... | 414/563 |
| 5,908,280 A * | 6/1999 | Allison | .......................... | 414/563 |
| 6,315,515 B1 * | 11/2001 | Young et al. | ................... | 414/563 |
| 6,851,253 B2 * | 2/2005 | Fontanes et al. | ................ | 56/16.7 |
| 7,153,082 B2 * | 12/2006 | Nolasco | ........................ | 414/563 |
| 7,494,313 B2 * | 2/2009 | Craze | ............................ | 414/563 |
| 2004/0081542 A1 | 4/2004 | Nolasco et al. | | |
| 2004/0105746 A1 * | 6/2004 | Nolasco | ........................ | 414/563 |
| 2008/0157504 A1 * | 7/2008 | Schuettenberg | ............... | 280/402 |
| 2010/0178145 A1 * | 7/2010 | Vigil | ............................. | 414/563 |

OTHER PUBLICATIONS

Catalog page from Miller Industries illustrating the CENTURY Wheel Lift, 2008 Miller Industries Towing Equipment Inc.

* cited by examiner

*Primary Examiner* — Paul N Dickson
*Assistant Examiner* — Tashiana Adams (57) ABSTRACT

The invention provide a restraint in the form of an attachment for connection to a free end of an angled arm body of a self loading, style tow truck wheel lift with the attachment being positioned adjacent to a lower, outer side wall of a wheel suspected of being unstable. A damaged ball joint or axle can allow an unstable wheel to pivot outwardly at its lower side wall, and in some cases, to collapse. The wheel keeper attachment restrains the wheel from such pivoting thereby allowing a successful lifting and towing of the vehicle front end.

16 Claims, 7 Drawing Sheets

TOW TRUCK WHEEL RESTRAINT AND METHODS OF USING SAME

FIELD OF INVENTION

This invention relates to a wheel restraint for a self-loading tow truck wheel lift mechanism to prevent outward pivoting of the lower portion of a vehicle wheel after or during wheel capture as well as methods of manufacture and use of same.

BACKGROUND OF THE INVENTION

Self-loading wheel lift devices are commonly used on a number of commercially available tow trucks for lifting a front end (or a rear end if the driver chooses) of a vehicle in order to tow a vehicle. One example of such a self-loading tow truck lift is the Century Express Series by Miller Industries Towing Equipment, Inc. located at 8503 Hilltop Drive, Ooltewah, Tenn. 37363. Such commercially available self-loading trucks can approach an end of the vehicle to be towed at about 90° to the parallel parked vehicle to bring a first end of a cross bar into engagement with the bottom portion of the front tread surface of a first front wheel, and a further backing of the tow truck causes the second end of the cross arm to swing about a pivot such that it brought into engagement with the bottom portion of the front tread surface of the second front wheel. Then, a pair of interior lifts members preferably in the form of L-shaped lift arms are pivoted by a hydraulic actuating mechanism about pivots to close the outer free ends of the lift arm behind the respective wheels in a pincer/like action so that the wheel is captured in a lifting position. This pincer action brings each of the L-shaped lift arms into contact with the bottom portion of the rear wheel tread surface of the first and second front wheels. With the wheels so captured, a boom lift for the cross bar is actuated to lift the cross bar thereby lifting both of the front wheels, and then, the raised front end of the vehicle may be swung outwardly into the street with the vehicle pivoting about the on rear wheels.

Pincer style, self-loading tow trucks can run into difficulties lifting vehicles that have sustained damage to their wheel ball joints, axles or other wheel mount stabilizing structures because the damaged wheel can collapse, tip severely or wobble from its normal vertical orientation such that the upper portion of the wheel collapsing inwardly while the lower portion of the wheel shifts outwardly. This can cause one of three problems; (1) a pronounced wobble in the damaged wheel can cause the pincer action of the lift to fail during an attempt to capture the damaged wheel; (2) where such a wobbly wheel is initially captured, twisting or jarring of the vehicle relative to the lift may cause the damaged wheel to slip free; (3) or, in the most severe cases, the damaged wheel may be collapse so that the frame of the vehicle rests against the ground, which can make it difficult or impossible to get the lift underneath the vehicle in order to capture the wheels. In this third scenario, where one or more wheels have collapsed, it is common for a pincer style, self-loading tow truck operators to call in another style tow truck to move the vehicle, such as, for example, calling for either a hook and chain style truck or a flat bed tow truck. All three of the unstable wheel scenarios discussed above involve significant risks that either the wheel capture process, vehicle lifting, or subsequent towing of a vehicle could result in additional damage to the towed vehicle, the tow truck or its lift mechanism.

OBJECTS OF THE INVENTION

Accordingly, an object of the invention is to provide a restraint for a pincer style, self-loading tow truck which heretofore could not lift the front wheels of a vehicle having damaged ball joints or a broken axel, as well as a method of successfully capturing such damaged wheels so that a pincer style, tow truck may lift and tow such vehicles.

Another object of the invention is to provide a simple and inexpensive restraint to a lift mechanism having a pair of angle-shaped lift arms which pivot inside of a damaged wheel when in a wheel captured position for lifting one end of a vehicle for subsequent towing. A further objective is to provide a method of use of a restraint in the form of an attachment for use with a self-loading lift apparatus in capturing, lifting and towing of a vehicle having an unstable wheel.

BRIEF SUMMARY OF THE INVENTION

One embodiment of the invention provides a restraint in the form of an attachment for connection to a free end of an angled arm body of a wheel lift with the attachment being positioned adjacent to a lower, outer side wall of a wheel suspected of being unstable. A damaged ball joint or axle can allow an unstable wheel to attempt to pivot outwardly at its lower side wall. The wheel keeper attachment restrains the wheel from such pivoting thereby allowing a successful lifting and towing of the vehicle front end.

In accordance with an embodiment of the invention, a method is provided for one end of a vehicle having an unstable wheel with a pincer style, wheel lifting mechanism having a pair of pivoted, angled, lift arms which are pivoted interiorly on a cross arm between the pair of wheels into wheel lift positions and then attaching a wheel restraint to a free end of at least one of the lift arms in position to engage and to hold at least one unstable wheel to prevent the unstable wheel from escaping wheel capture as would prevent successful lifting and towing of the vehicle.

In another embodiment of the invention, a method of lifting a vehicle with a collapsed front end is provided that includes the steps of jacking up the front end of the vehicle, arranging the front wheels of the vehicle into an upright, straightened position, activating the pincer style lift arms to capture the wheel and attaching a wheel restraint to a pincer style lift arm of an self-loading tow truck, with the wheel restraint contacting (or closely adjacent) the lower exterior side wall of the wheel.

Another embodiment provides a method of lifting a parallel parked vehicle having a damaged ball joint that comprises the steps of: lowering a wheel lift cross bar to adjacent the ground and backing up the tow truck to engage the outer front wheel to pivot the cross arm to extend across the front of the vehicle. The wheel lift arms are then pivoted to an interior wheel lift position to bring free ends of the lift arms in position to engage the respective front wheels; and positioning a wheel restraint on the wheel lift in a position to prevent the wheel front pivoting or turning as would prevent a successful wheel capture for lifting and towing of the vehicle.

DETAILED DESCRIPTION OF THE PREFERRED EMBODIMENTS

As shown in the drawings of an illustrated embodiment, a wheel restraint 10 is shown in its preferred form as an attachment for use in a method for successfully restraining a front wheel 12a (see FIG. 2), in a wheel captured position, despite a damaged ball joint or other defect which causes a wheel to wobble or collapse. The wheel restraint 50 attaches to left wheel lift 14 and a right wheel lift 16, which when raised together, lift the front end of a vehicle when a boom 24 on a tow truck 26 is raised. The raising of the boom 24 by a lift mechanism 23 raises an attached cross beam or arm 28 spanning the front of the vehicle and carrying the wheel lifts 14 and 16. The tow truck and lift mechanism illustrated herein are exemplary of various self-loading, pincer style interior wheel lifts that insert a pair of wheel lift arms between the vehicle wheels of one end (usually the front end) of a vehicle and those arms are actuated to close onto the bottoms of the front and rear tread portion of those wheels in the course of wheel capture. The present invention is not limited to the particular pincer style, lift mechanism being illustrated and described herein in detail. That is, the illustrated lift mechanism is only exemplary of various pincer style, wheel lift mechanisms that could employ the methods and apparatus of the present invention as defined by the claims herein.

The illustrated, commercially available lift mechanism 23 comprises the boom 24 which is mounted on the truck vehicle 22 and carries the pivotal mounted cross arm 28; the lift mechanism raises and lowers an outer end of the boom and a pair of wheels after the capture thereof. In operation, the tow truck driver can back the tow truck at significant angle (approaching 90°) to a parallel parked, tow vehicle, which usually has other parked vehicles in front of and behind the tow vehicle. This parallel parked arrangement does not allow sufficient space for a direct frontal approach by the tow truck to the tow vehicle. The driver lowers the boom to adjacent the ground and backs the tow truck and lowered boom to shift the cross arm 28 toward an outer tread surface 12b wheel, front wheel 12a in the illustrated example shown in FIG. 2, to contact one end of the cross arm with the left wheel 12a causing the cross arm to turn about a pivotal connection 30 to the boom to swing the arm into a position generally parallel to the front end of the towed vehicle. The driver then actuates an arm actuating mechanism which pivots the wheel lifts 14 and 16 to respectively position themselves behind the rear tread surface 12d of front wheels and into wheel capturing and lifting position.

Figure 1:
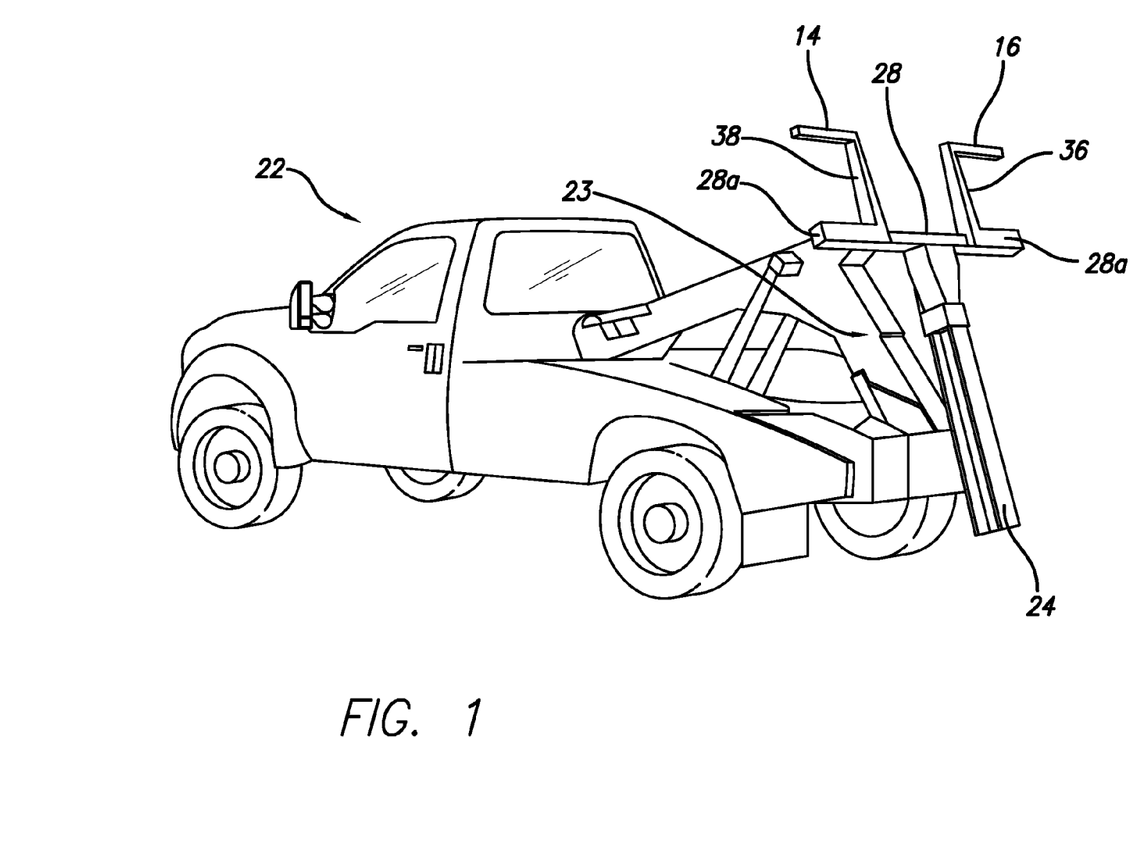
FIG. 1 is diagrammatic view of a pincer style, self-loading tow truck having a vehicle lift mechanism for lifting a front or rear end of a vehicle by capturing the pair of front or rear wheels for lifting and towing of the vehicle by the lifted wheels.
Figure 2:
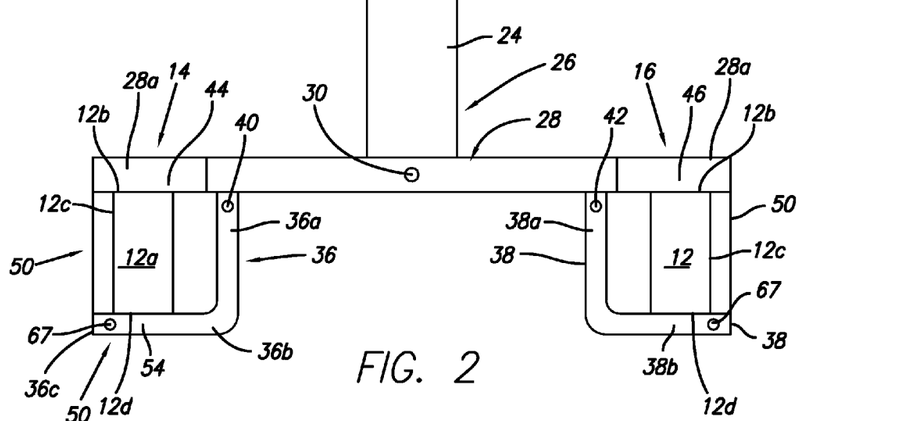
FIG. 2 is a plan view illustrating diagrammatically the lift mechanism of FIG. 1 having a pair of angled lift arms having a wheel restraint in the form of an attachment to the left, angled, lift arm.
Figure 2A:
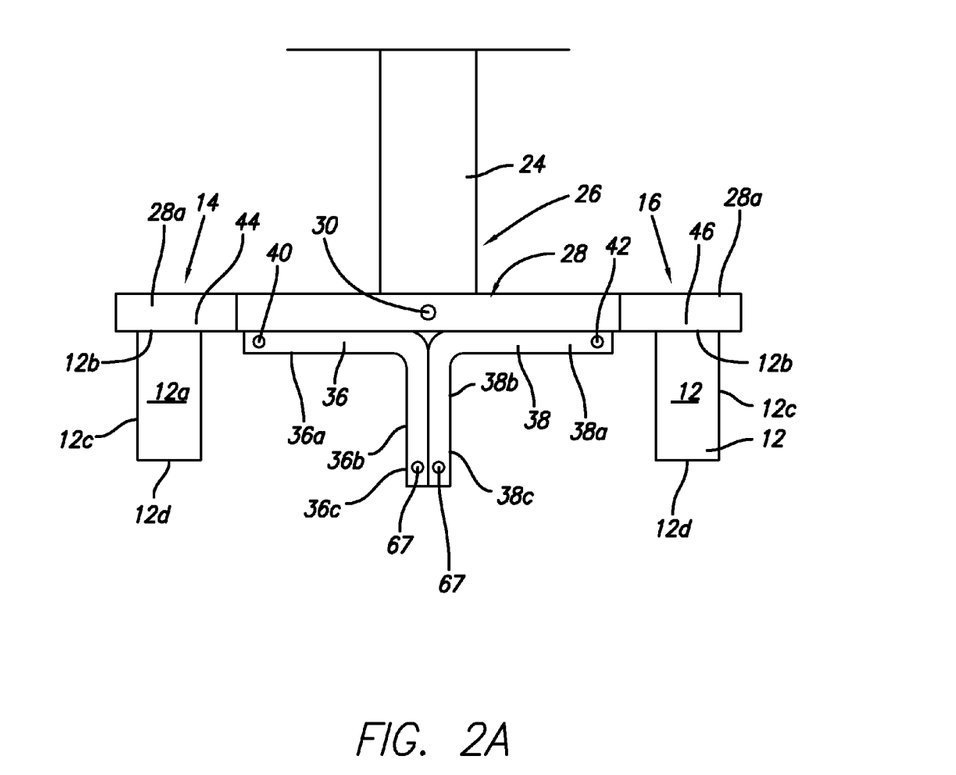

More specifically, as best seen in FIGS. 1, 2 and 2A, the first and second illustrated wheel lifts 14 and 16 include pivoting lift arms 36 and 38, which are L-shaped with inner arm portions 36a and 38a each attached at respective pivots 40 and 42 to the cross beam 28 toward the central portion of the cross beam 28. The pivoting arms 36, 38 are illustrated in their outwardly pivoted wheel capture or pincer position in FIG. 2 and illustrated in their inwardly pivoted position in FIG. 2A just prior to actuation of the pivoting arms 36, 38 to capture wheels 12 and 12a. Outer arm portions 36b and 38b of the pivoting lift arms 36, 38 extend at about 90° to the inner arm portions and serve to engage the lower portion of the back, tread surfaces 12d of the wheels when in a wheel lifting position. More specifically, outer free ends 36c and 38c on these outer arm portions are positioned immediately behind the front wheels into contact with rear tread surfaces 12d in wheel lifting positions. The outer free ends of these arm portions 36b and 38b extend to behind the vehicle wheels and below the turning axis of the front wheels in this illustrated embodiment. When the boom 24 lifts the cross arm 28, the free ends 36c and 38c engage rear tread surface 12d to push against the back lower sides of the wheels with an upward lifting force. Prior to actuation of the pivoting arms 36, 38 as best seen in FIG. 2A, a pair of front wheel lift surfaces 44 and 46 carried by the cross arm 28 are arranged to contact the front lower tread of the wheels with an upward lifting force. Thus, the front wheels 12 and 12a are captured between the interior arm free ends 36c and 38c and the cross front and back tread surfaces of arm lift surfaces 44 and 46. The captured wheels allow the tow truck driver to lift the vehicle's front end and to swing the vehicle's front end outwardly into the street with the vehicle's rear wheels turning. Of course, if the vehicle is not parallel parked and there is sufficient room, the tow truck may approach the vehicle from the front end in a more linearly aligned manner. After wheel capture, the tow truck driver will proceed to tow the raised front end with the rear wheels of the towed vehicle rolling along the street to the delivery point for the vehicle. One example of a pincer style, tow truck mechanism is commercially available and is sold under the name of Century Express Series by Miller Industries Towing Equipment, Inc. located at 8503 Hilltop Drive, Oaltewah, Tenn. 37363. Hence, the operation and description of this prior art tow truck lift mechanism is described only broadly herein; and further detailed description or operation of the tow truck lift is well known.

In accordance with this illustrated embodiment, there is provided a restraint in the form of a detachable attachment or accessory 50 (see FIG. 3) that may be attached to pivoting lift arms 36 and/or 38 of a wheel lift mechanism to restrain a wheel from wobbling, collapsing sideways, or becoming jarred loose from the tow truck lift. The restraints of the present invention are particularly useful when towing a vehicle with a damaged ball joint or broken axle as in a captured position between wheel lifts 14 and 16 the tendency of such a damaged wheel is to swing its lower portion outwardly from the vehicle. In other words, with an unstable wheel there is a tendency for the top portion of the wheel to collapse inwardly as the lower portion of the wheel collapses outwardly. After towing the vehicle to the desired location, the attachment may be detached from the associated lift and stored until it is again needed.

Figure 3:
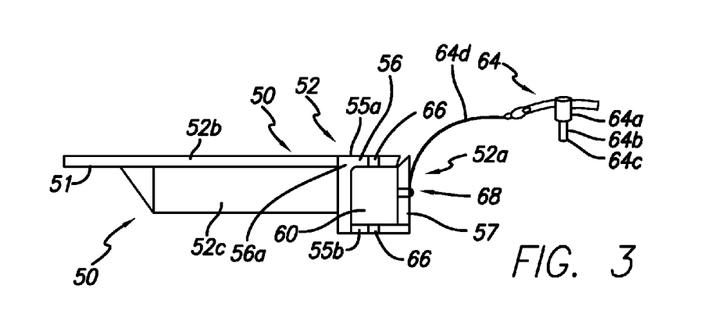
FIG. 3 is a front elevational view of the attachment shown in FIG. 2.
Figure 4:
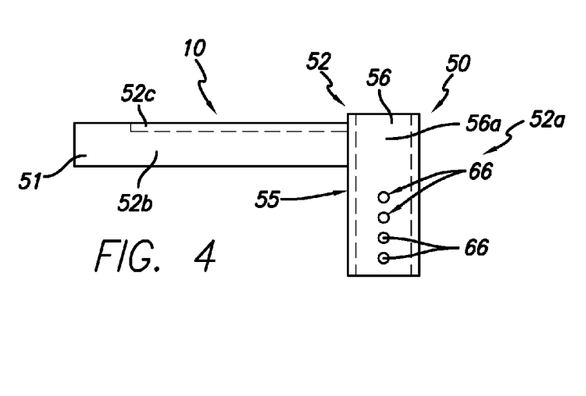
FIG. 4 is a plan view of the attachment shown in FIG. 3.
Figure 5:
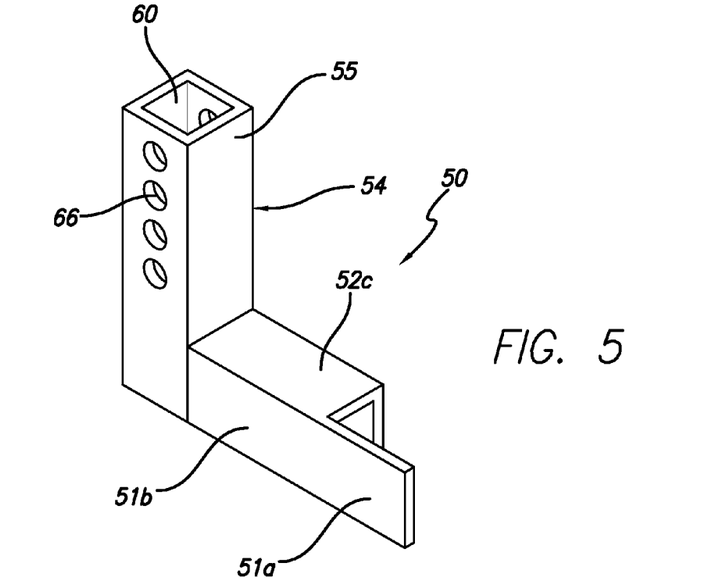
FIG. 5 is a perspective view of the attachment of FIG. 2.

The illustrated attachment 50 of FIGS. 3-5 comprises an angle-shaped body 52 having an attachment or connection portion 52a for attaching to a free end 36c or 38c of pivoting lift arms 36 or 38 and having a wheel engageable portion 52b extending at an angle from the attachment portion for positioning in a restraining position against an outer lower side wall 12c, the front wheel side wall 12a having an unstable wheel support component, such as a damaged ball joint or axle. A connecting or locking device 64 may be used to attach or secure the attachment in position. Herein, the locking device 64 is in the form of a detent fastener or the like connects the angle-shaped body to the free end of the lift arm.

Referring now in greater detail to the attachment device 50 illustrated in FIGS. 3 and 4, the angle shaped body 52 is provided with the attachment portion 52a in the form of a hollow tube 55 formed by two angle pieces 56 and 57 (FIG. 3) that are welded or otherwise joined together to form a tube with a hollow, square-tubular space 60 being sized to telescope over the free end 36c of the lift arm 36. The angle pieces 56, 57 are preferably made of aluminum, but iron, steel or similar metals having sufficient strength to resist any forces trying to break or damage the same during use may be used.

Preferably, the attachment portion 52a also includes a locking device 64 (FIG. 3) for securing the angle shaped body against shifting along the free end 36c so significantly that the attachment 50 separates from the wheel lift arm or shifts along the latter as would allow the wheel to pivot or turn into a position that is incompatible with good wheel capture. As set forth above, such turning and undesirable pivoting would most commonly occur when a vehicle involved in a traffic accident sustains damage to the ball joint or axle adjacent to one or both of the front wheels. The illustrated locking system comprises a detent in the form of pin 64 and a series of holes 66 in an upper wall 56a of tube 55 for receiving the pin 64 which is also inserted into an aligned hole 67 (FIG. 2) in the free end 36c of the lift arm 36. It is preferred that the locking device allow lateral adjustment to allow for different spans between the wheels to be captured and for different widths tire treads or wheel span widths. In this embodiment illustrated in FIG. 3, four holes 66 are provided on attachment portion 52 on 0.5 inch centers. Manifestly, the number and spacing of holes 66 may be varied from that illustrated. Although the locking pin could be of various types, the illustrated locking pin is a commercially available one having a T-handle 64a and the push pin or shaft 64b, when the shaft 64b is pushed down into the body of the pin this movement shifts detent balls 64c to be aligned with grooves in the pin 64b so that the detent pin can retracted from a hole 67 in the lift arm. When the push pin shaft is released, an interior spring (not shown) shifts the pin outwardly and cams the detent balls 64c out to the locked position. In order to assure against loss of the pin, it is preferably attached by a lanyard 64d that is secured at its opposite end by a fastener 68 to a flange wall of the angle iron 57.

In the embodiment illustrated in FIGS. 3-4, the attachment 50 is formed with sufficient length to span the distance between the lift arm free end 36c or 38c and the adjacent end of the cross arm 28 adjacent to its lift surface 44 or 46. A distal end of the attachment 50 is preferably formed with a cross arm engaging end 51 that is in the form of a flat plate that overlies and rests on the top of the cross arm 28. This flat plate is integral with upper, horizontal flange 52b which is in turn integral with a depending, vertical flange 52c.

Figure 6:
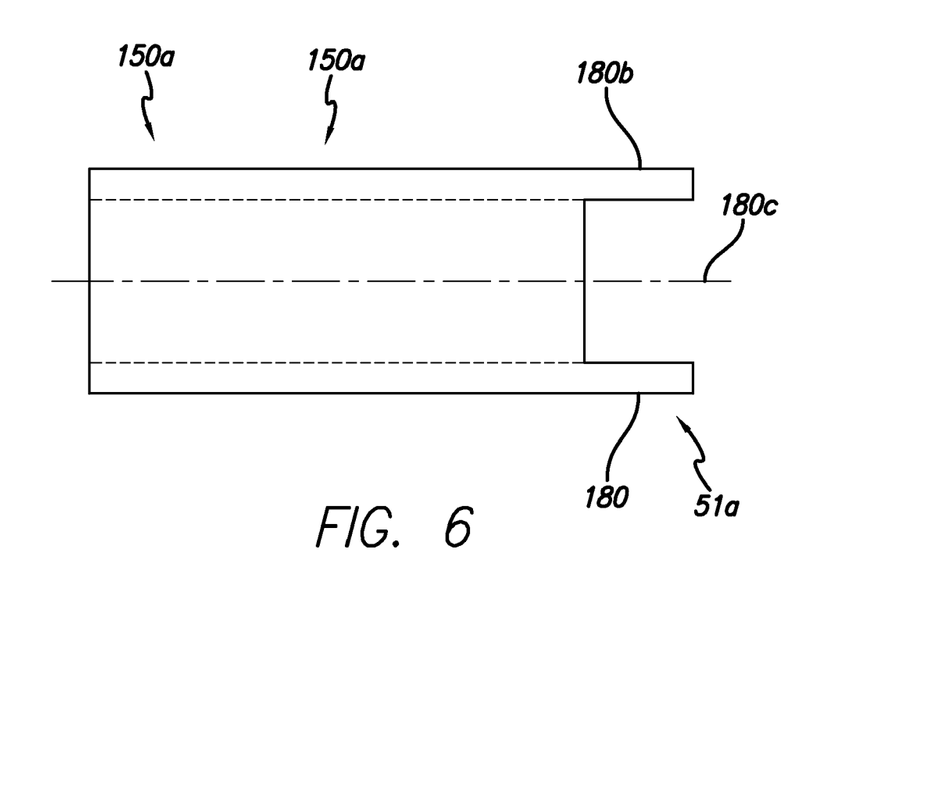
FIG. 6 is a plan view of another embodiment of the restraint in the form of a universal attachment for attaching to either a left or right wheel lift arm.
Figure 7:
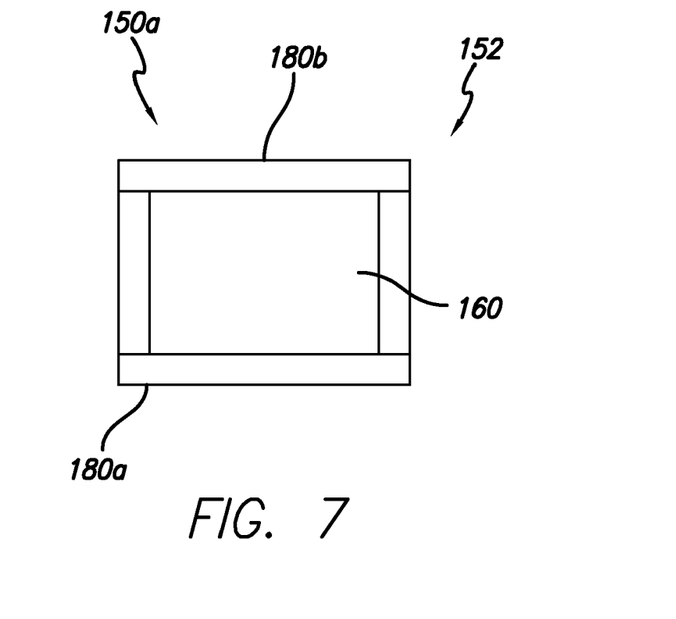
FIG. 7 is an end view of the attachment shown in FIG. 6.
Figure 8:
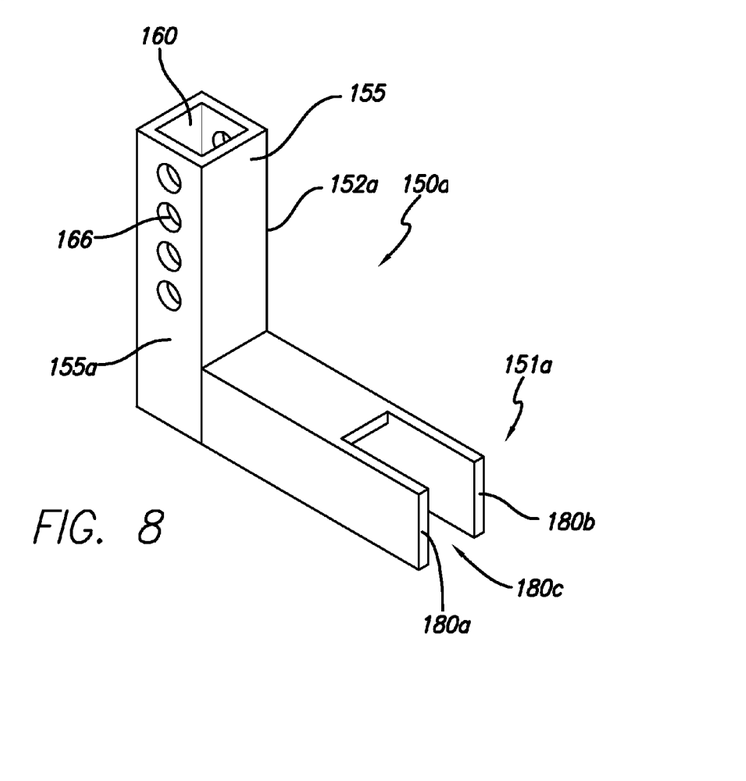
FIG. 8 is a perspective view of the attachment shown in FIGS. 6 and 7.

In another embodiment of the attachment, which is illustrated in FIGS. 6, 7 and 8, there is shown an attachment 150 having a cross arm engaging end or portion 151, which is formed with both an upper flat plate 180 and a lower horizontal, flat plate 180. These flat plates are disposed parallel to one another and define a slot 180 between which is positioned the cross bar end 28a where the attachment is attached and in its wheel restrain position. Manifestly, the cross arm engaging portion provides additional support for the attachment and allows the attachment to span the entire distance between the free ends of the wheel lift arm and the cross arm. The cross arm engaging portion may also be secured to the cross bar by a device if so desired. On the other hand, the attachment arm need not span the entire distance between the cross arm and the free end of the wheel lift arm. Also, the attachment could be secured to the cross arm 28a and extend therefrom toward the free end of the lift arm rather than described herein where the attachment is secured to the free end of the lift arm extends toward the cross arm 28a.

For the purpose of providing a universal attachment that may be secured to either the left wheel, lift arm 36a, the universal attachment show in FIGS. 6, 7 and 8, is formed with the slotted end so that the plate 80a will be on top of a cross arm 28 when the left wheel 12a is being restrained as show in FIG. 2. On the other hand, when the right wheel 12 shown in FIG. 2 is to be restrained because of damaged ball joint or the like, the attachment will be rotated 180° with the flat plate 180b being on top of the right cross arm end 28a and with the flat plate 180a being beneath the cross arm end. In FIG. 2, the connection or attachment portion 152a extends to the right along the free end of the wheel lift arm 36 toward the right side of the vehicle. Conversely, when the attachment is used to restrain the right wheel, the connecting portion 152a will be extending along the free end of the wheel lift arm 38 toward the left wheel.

In the embodiments above described, the attachment 50 or 150 is provided with a tubular bore 60, 160 of square configuration defined by upper and lower sidewalls (55a, 55b, 155a, 155b, respectively) and that were essentially disposed in horizontal places when the connecting portion was oriented to telescope onto a free end 36c or 38c of the wheel lift arms 36 or 38.

Figure 9:
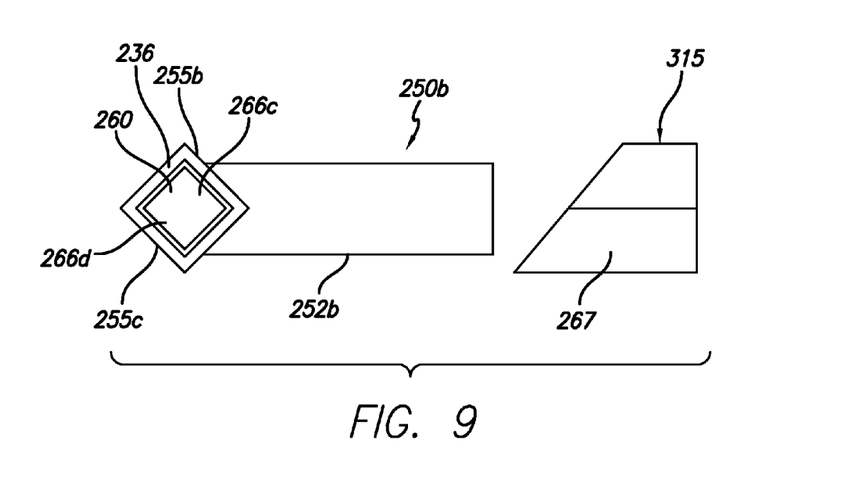
FIG. 9 is an elevational view of another embodiment of the invention having a diamond shape with a diamond shaped bore for telescoping over a diamond shaped free end of a pivoted, lift arm.

In another embodiment illustrated in FIG. 9, the hollow, square tube 255 is rotated about 45° to present a generally diamond shape orientation to the hollow bore 260 because the free end of the lift arm (not shown) for use with the attachment 252 shown in FIG. 9 is also oriented to have a diamond shape when viewed from an end view thereof. The locking pin 264 may be used with the locking pin being inserted through one hole 266c in the 45° inclined sidewalls (FIG. 9) of the tube 255c and then through hole 267 in the free end of the lift arm 37 shown in FIG. 9 and finally through an aligned hole 266d in the inclined wall of the diamond shaped hollow tube 255c shown in FIG. 9. When so locked on the free end, the wheel engaging portion 252b (FIG. 9) is positioned to restrain unstable wheel despite a damaged ball joint, axle or the like.

It is to be understood that the free ends (FIGS. 2-8 or FIG. 9) of these commercially available lift mechanisms having a pair of interior, pivoting lift arms 36 and 38 do not typically have the holes (67, 167, 267, respectively) formed therein. Accordingly, the stock left mechanism will need to be modified by drilling holes (67, 167, 267, respectively) therein so that the attachment can be attached by locking pin 64 after the tubular connecting end of the attachment is telescoped and the hole 67 is aligned with a pair of holes 66a and 66b or 66c and 66d. Subsequent to this invention, the original equipment manufacturers of the lift mechanism may desire to provide the free ends 36c and 36d of the swingable arms with holes therein to accommodate a locking when the holes in the hollow tube 255 are aligned with a hole on the free end.

Figure 10:
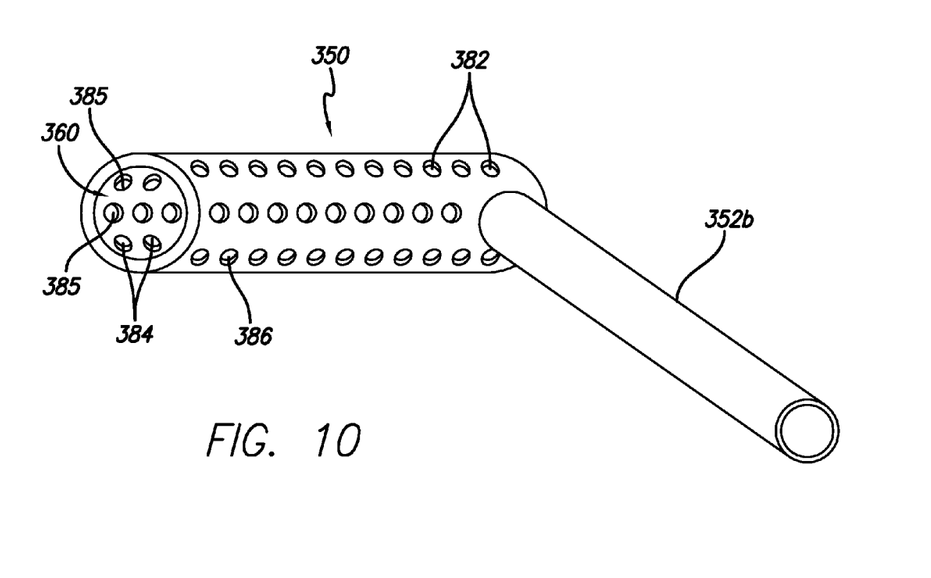
FIG. 10 is a perspective view of a still further embodiment of a cylindrical attachment having a circular bore used for telescoping over either a square cross section or a diamond cross section of a free end of a pivoted lift arm.

In accordance with the further embodiment such as illustrated in FIG. 10, an attachment 350 is designed to accommodate either the square shaped, free end 36 or 38 or the diamond shaped free end 237 (FIG. 9) of the swingable lifting arm. The attachment of FIG. 10 is also "universal" in that it not only may be attached not only to either a square end or a diamond free end but it may also be used for either capturing a driver side (left side) or a passenger side (right side) wheel to position the wheel restraint portion 352b to hold against loss of wheel capture to a damaged ball joint, etc. To these ends, the attachment illustrated in FIG. 10 has an annular cross section and a cylindrical tubular bore 360 which can be slid in telescopic fashion over either a square shaped free end 36c or 38d (FIGS. 2-8), diamond-shaped, free end (FIG. 9) 236, or a cylindrically shaped free end (not shown).

For the purpose of connecting to a square shaped free end, the cylindrical side wall 80 of the connecting portion may be provided with a first row 382 of holes 366d for alignment with a hole 67 in the free end 36c or 38c (FIG. 2) to receive a locking pin 64. When the attachment is secured for a wheel at the driver side, free end the holes in row will be on top and where the attachment is secured for a wheel at the passenger side, the attachment will have been rotated 180° so that row 382 of holes formerly on top are now at the bottom of the free end of the swingable arm. The former lower row 384 of holes will now become a top row.

In use with a diamond-oriented end of a free arm 36 of FIG. 9, row 385 and row 386 each having holes are used with these holes being circumferentially spaced at 90° from one another and each at 45° from an adjacent top row 382 or bottom row 384 of holes. When the tube connection is rotated 180° when used with first a driver side wheel and at a subsequent time with a passenger side wheel, the upper row of holes will take an opposite position with the lower, row 386 becoming the top row and the upper hole row 385 becoming the lower row. Thus, it will be seen that an embodiment is provided for universal use with a square oriented, or a diamond oriented free end of a swingable, interior lift arm and for use with either a passenger-side or driver-side, wheel capture.

Figure 11:
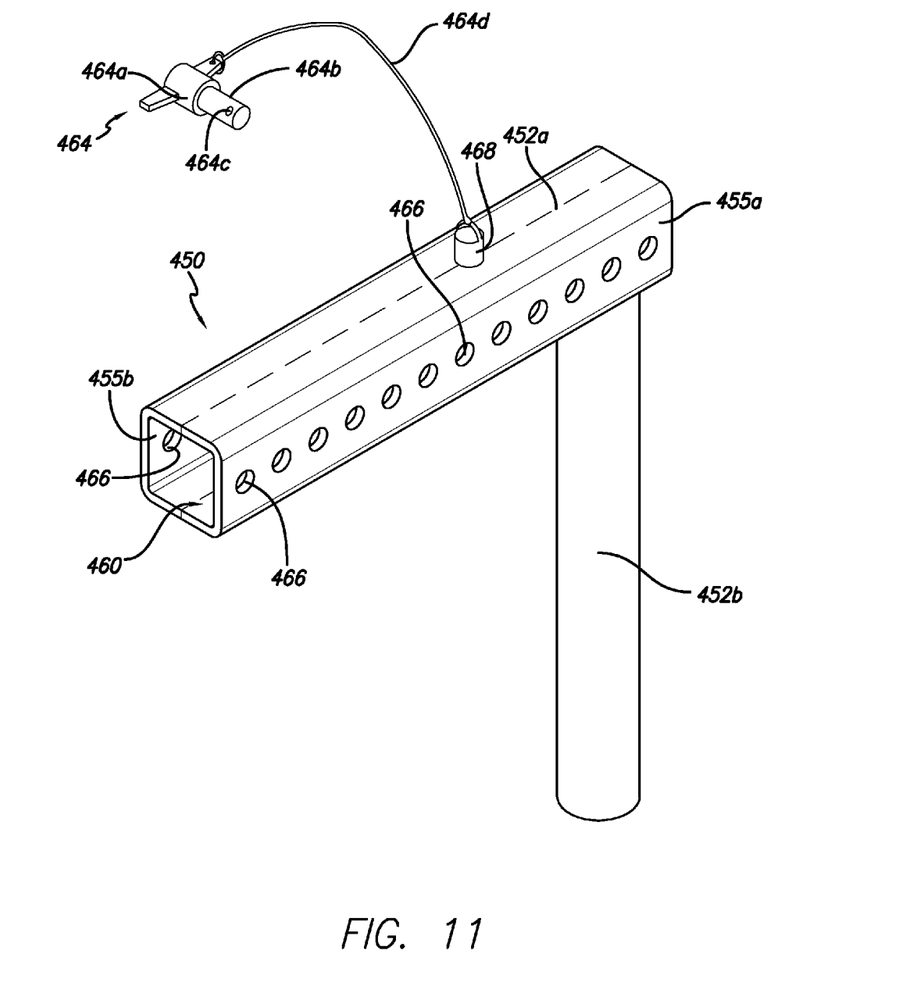
FIG. 11 is a perspective view of another embodiment of the invention in which embodiment of a square cross-section attachment having a cylindrical tire contacting arm.

In another embodiment of the invention shown in FIG. 11, the illustrated attachment 450 comprises an angle-shaped body 452 having an attachment or connection portion 452a for attaching to a free end 36c or 38c of pivoting lift arms 36 or 38 and having a wheel engageable portion 452b extending at an angle from the attachment portion for positioning in a restraining position against an outer lower side wall 12c, the front wheel side wall 12a having an unstable wheel support component, such as a damaged ball joint or axle. A connecting or locking device 464 may be used to attach or secure the attachment in position.

Referring now in greater detail to the attachment device 450 illustrated in FIG. 11, the angle shaped body 452 is provided with the attachment portion 452a in the form of a square cross sectioned, tube member preferably formed by mating together two u-shaped members 455a and 455b and welding along the upper edges of their respective sidewalls. The resulting hollow, square-tubular space 460 being sized to telescope over the free end 36c of the lift arm 36. The two u-shaped pieces 455a, 455b are preferably made of low carbon steel, but may be made from aluminum, iron or similar metals having sufficient strength to resist any forces trying to break or damage the same during use may be used. The holes 466 are drilled into the two base portions of the two u-shaped members 455a and 455b portions, preferably after they are welded to ensure the holes a precisely aligned to avoid a sloppy connection with the locking device 464.

Preferably, the attachment portion 452a also includes a locking device 464 similar to the one describe above with reference to FIG. 3. The structures indicated by reference numbers 464a-d correspond to the structures indicated by reference numbers 64a-d and perform the same function of securing the angle shaped body 452 against shifting along the free end 36c. In the embodiment illustrated in FIG. 11, the twelve pairs of matching holes 466 are provided on attachment portion 452. The number and spacing of holes 466 may be varied from that illustrated in FIG. 11.

In the embodiment illustrated in FIG. 11, the wheel engageable portion 452b of attachment device 450 is of sufficient length to nearly span the distance between the lift arm free end 36c or 38c and the adjacent end of the cross arm 28 adjacent to its lift surface 44 or 46. The wheel engageable portion 452b is also formed from a low carbon steel, but is a cylindrical tube. The wheel engageable cylindrical tube 452b is welded to the attachment portion 452a. The illustrated attachment 450 of FIG. 11 functions in a similar manner to attachment 50 of FIGS. 3-5, except that attachment 450 has a rounded outer diameter that is less likely to cut, scuff or otherwise damage the outer lower side wall 12c than the angled surface of 52b.

The methods of the invention provide a method of lifting a vehicle having a damaged ball joint or broken axle with a self-loading style tow truck. The method is described with reference to right wheel 12a and attachment 50 as shown in FIG. 2, but applies also to the other attachments shown herein 150, 250, 350 and 450, as well as to left wheel 12. The wheel lifting mechanism has a pair of angled lift arms 36 and 38 which are pivotally mounted at pivot mounts 40 and 42 on the cross arm 28 with the lift arms being pivoted inwardly in a pincer fashion to a wheel lift position where the lift arms have captured the wheel between the arms 36 and 38. After so being, so located, an operator will then attach a wheel restraining attachment member 50 to at least one of the free ends of the lift arms, e.g., the free end 36c of lift arm 36 as shown in FIG. 2, and with the attachment extending across the outer lower side of the wheel. The front wheels of the vehicle may be lifted with the left wheel (FIG. 3) captured between the lift arm 36 and front wheel lift support 44 on the cross arm 28; and as the lower portion of the left front wheel tries to collapse, e.g. by pivoting outwardly to the left as viewed in FIG. 2 because of the damaged ball joint, this lower wheel portion pushes against the attachment 50. Thus, the wheel remains captured due to the restraint attachment so that the vehicle front end may be lifted and towed. In this illustrated embodiment, the operator attaches the restraining member attachment 50 to a free end of the lift arm such as, for example, by telescoping the tubular portion 55 over the free end 36a. Preferably, the restraining member spans the distance between the free end and the cross bar.

A first method of the invention is directed to enabling a pincer style, self-loading tow truck to capture the wheels of a damaged vehicle where one or more of its wheels have tipped over or collapsed (typically with the lower portion pivoting out and upper portion pivoting inwardly) such that at least a portion of the vehicle frame is resting on the ground, road or parking lot. In such circumstances, prior pincer type trucks, which lack the wheel stabilization system of the present invention, are typically not used as there is often I insufficient vertical clearance for the boom 24 and cross arm 28 of such a conventional pincer style, truck to fit underneath the damaged vehicle in order to capture the wheels. Accordingly, this particular method of the invention allows for the use of a pincer style, truck under those circumstances by the steps of, first, jacking up the vehicle frame to a height sufficient to allow insertion of the boom and cross bar of a pincer style, tow truck lift under the front end of the vehicle. This can be done by using a conventional car jack, utilizing the hydraulic lift of the truck to temporarily lift that portion of the frame and then placing support block of suitable heights under the frame or by other suitable means. After the vehicle is jacked up, then the collapsed wheel is pivoted back to its pre-damage orientation with the lower and upper side walls substantially vertically aligned. If the wheel is too wobbly to maintain a vertical aligned sidewall position, straps or other suitable devices may be utilized to temporarily hold it in position until the wheel capture process is complete. Then, the lift arms of the pincer style, tow truck lift are moved into contact with the lower portion of the front tread surfaces 12b of the first and second wheels. Thereafter, the wheel lift arms 36 and 38 are pivoted into contact with the lower portion of the back tire tread surfaces 12d of the wheels. Next, a wheel restraint 50 (or 150, 250, 350 or 450) is positioned and attached to the lift arms to restrain the outer surface 12c of lower portion of the collapsed wheel's side wall to prevent outward pivoting of the bottom portion of the damaged wheel during lifting and towing. Thereafter, with the front wheels stabilized, the damaged vehicle can be lifted by the stabilized wheel(s) and the jack can be removed from the vehicle frame. Of course, if both wheels to be captured on the vehicle have been damaged or the axle on that end is broken, it will be necessary to attach a restraint to both wheels on that end of the vehicle in order to safely tow such a vehicle with a pincer style, self-loading tow truck. In fact, applicant believes that it is a best safety practice for both captured wheels to be stabilized with the restraints of the invention to help ensure that the those wheels cannot work loose from the grip of the pincer style, lift during lifting or transport to the towing storage facility, particularly where rough roads or difficult maneuvering are anticipated by the driver.

Another method of towing of the invention comprises a method for towing vehicle that are not readily accessible from the front or rear by the tow truck, such as were a vehicle to be towed is parallel parked. In this method of the invention, the lifter boom is lowered so that the wheel lift cross bar or arm 28 to adjacent the ground and the tow truck is backed at a significant angle to the vehicle. The angle of approach can be as much as 90°, but can also be significantly less where conditions allow a shallower angle of approach. The outer wheel tread of one of the vehicle wheels is contacted by one end of the cross bar to swing the cross arm into the proper orientation for towing the angled vehicle. The pivoting of the cross bar concludes when the other end of the cross bar makes contact with the other outer wheel tread on the selected end of the vehicle. Then, the wheel lift arms and are pivoted into wheel lift positions for engagement with the inner portion of the wheel tread on the selected end of the vehicle. Next, a wheel restraint is positioned on at least one of wheels to restrain the lower portion of the wheel side wall from moving outwardly during vehicle lifting or the towing process. In this way, the drive can ensure that an unstable wheel (e.g., one with a damaged ball joint or other wheel support structure) can be towed without the unstable wheel escaping the wheel capture. In this method, the restraint is preferably detachable, i.e., it can be readily attached and detached from one or more of the lift arms. On the other hand, the restrain member 50 may be permanently mounted on the lift arm 36 or 38 or mounted on the cross arm and then positioned such as by swinging the restraint member about a pivot connection to the cross arm 28 or to the lift arm. After use, the restrain member would be pivoted back to storage positions until the drive perceives the need for them due to the possibility that a damaged vehicle has an unstable wheel. Of course, some drivers or their employer's may make the judgment that the risk that an unstable wheel might damage a vehicle, the tow truck or lift mechanism that the use of the restraint of the invention could become a standard best safety practice.

Other modifications or variations of the present invention are possible in light of the above teachings of the invention. The invention may be practiced in other forms than described herein and be covered by the scope of the claims for this invention.

What is claimed is:

1. A wheel restraint attachment for use with a self loading style, wheel lift mechanism of a tow-truck for restraining a lower portion of a towed vehicle's wheel against outward pivoting, the restraint attachment comprising:
   an angled body for attachment and detachment from a free end of a lifting arm of the pincer style, wheel lift mechanism;
   an attachment portion on the angled body for attaching to the free end of a wheel lift arm which extends outwardly from the towed vehicle;
   a wheel engagement portion on the angled body extending at angle to the attachment portion for being positioned adjacent to an exterior sidewall of the wheel to prevent its bottom portion from pivoting outwardly away from the vehicle, the wheel engagement portion being elongated to extend along the exterior surface of the towed vehicle's wheel side wall; and
   a connecting device for detachably attaching the angled body to the free end of the lift arm to allow the wheel engagement portion to be positioned in its wheel lifting position.

2. A wheel restraint attachment in accordance with claim 1 comprising:
   the attachment portion being adapted for universal attachment to the free end and to extend in the restraint position for either a left side or right side vehicle wheel.

3. A wheel restraint attachment in accordance with claim 1 comprising:
   the attachment portion being tubular with the free end of the lift arm being insertable into a hollow interior of the tubular attachment portion.

4. A wheel restraint attachment in accordance with claim 1 wherein the connecting device comprises:
   a locking device having a locking pin insertable through aligned holes in the attachment portion and the free end of the lifting arm.

5. A wheel restraint attachment in accordance with claim 3 wherein the tubular attachment portion is cylindrical in shape and can be telescoped over either a square or diamond cross sectioned, free end of the lift arm.

6. A wheel restraint attachment in accordance with claim 1 comprising:
   the wheel engageable portion being dimensioned to extend across the entire lower side wall of the vehicle wheel to a cross arm of the wheel lift mechanism.

7. A wheel restraint attachment in accordance with claim 6 comprising:
   a slot on the free end of the wheel engageable portion to receive therein the cross arm of the wheel lift apparatus.

8. A method of lifting a vehicle having at least one unstable wheel with a self loading, tow truck wheel lift mechanism having a pair of angled wheel lift arms pivotally mounted on a cross arm with the lift arms being pivotable into vehicle wheel lift positions at which the lift arms are positioned interiorly between the wheels to be lifted, the method comprising:
   positioning the angled lift arms between the wheels and pivoting them to bring wheel support portions on the angled lift arms into position to lift; and attaching an angled body to the free end of at least one of the wheel lift arms to restrain the associated wheel against turning a lower side of the wheel outwardly to an extent that prevents lifting and towing of the vehicle by the tow truck lifting mechanism.

9. A method in accordance with claim 8 further comprising:

attaching the angled body to an outwardly projecting end of the wheel lift arm after it has been positioned behind a vehicle wheel.

10. A method in accordance with claim 8 further comprising;

extending the angled body from a free end of the angled wheel lift arm across a lower, outer side of the wheel to the cross arm.

11. A method in accordance with claim 8 further including the steps of:

jacking up a portion of a vehicle having a collapsed wheel to provide sufficient vertical clearance between the vehicle frame and the ground to allow insertion of the wheel lift mechanism under the vehicle adjacent to the collapsed wheel in order to capture the collapsed wheel, standing up the collapsed wheel so that its lower sidewall and upper sidewall are once again substantially vertically aligned, and wherein the step of attaching an angled body to the free end of at least one of the wheel lift arms includes arranging the angled body to engage the lower out surface side wall of the formally collapsed, unstable wheel to stabilize the unstable wheel during the wheel capture and towing processes.

12. A self loading, wheel lift towing apparatus comprising:

a cross beam for extending across spaced, front wheels of a vehicle;

first and second wheel support members carried on the cross beam;

pivotal mounts for the wheel support members to allow pivoting of the wheel support members from a non-wheel lifting position to a wheel lifting position between the wheels of the vehicle; and at least one angled body for attaching to a free end of at least one of the wheel support members and for engaging an unstable wheel by preventing a lower portion of at least one unstable wheel of the vehicle from moving outwardly and an upper portion of the wheel from moving inwardly after wheel capture position.

13. An apparatus in accordance with claim 11 comprising:

the portion of the angled body comprising an elongated bar for extending across the entire lower outer side of the wheel.

14. An apparatus in accordance with claim 11 comprising:

the angled body having an attachment; and a connector for connecting the attachment to the first and second wheel support members.

15. An apparatus in accordance with claim 14 comprising:

the connector being reversible to provide either a left or a right hand connection to the respective wheel support members.

16. An apparatus in accordance with claim 11 comprising:

the angled body having a portion for extending across the outer, lower side of the wheel to be engaged by the lower, outer side of the wheel as it tends to pivot outwardly.

* * * * *